US012728986B2

(12) United States Patent
Sichik

(10) Patent No.: US 12,728,986 B2
(45) Date of Patent: Sep. 8, 2026

(54) AIRCRAFT ELEVATOR FEEL COMPUTER TEST APPARATUS

(71) Applicant: ATEQ & COBRA AVIATION, INC., Arlington Heights, IL (US)

(72) Inventor: Denis Sichik, Wilmette, IL (US)

(73) Assignee: ATEQ & Cobra Aviation, Inc., Arlington Heights, IL (US)

( * ) Notice: Subject to any disclaimer, the term of this patent is extended or adjusted under 35 U.S.C. 154(b) by 273 days.

(21) Appl. No.: 18/743,765

(22) Filed: Jun. 14, 2024

(65) Prior Publication Data

US 2024/0417068 A1 Dec. 19, 2024

Related U.S. Application Data

(60) Provisional application No. 63/521,573, filed on Jun. 16, 2023.

(51) Int. Cl.
*B64C 13/46* (2006.01)

(52) U.S. Cl.
CPC .................................... *B64C 13/46* (2013.01)

(58) Field of Classification Search
CPC ...................................................... B64C 13/46
See application file for complete search history.

(56) References Cited

U.S. PATENT DOCUMENTS 2,797,882 A * 7/1957 Servanty ................. B64C 13/24
244/76 R
4,106,728 A * 8/1978 Griffith ............... B64C 13/0421
244/221
4,384,469 A * 5/1983 Murphy .................... G01F 1/46
73/1.29

(Continued)

FOREIGN PATENT DOCUMENTS

WO WO-2012034183 A1 * 3/2012 ............ G01F 25/15
WO 2022128718 A1 6/2022

OTHER PUBLICATIONS

AvionTEq, "Product Data Sheet for Air Data Accessories Kit Model No. ADA737-678 Boeing 737-600, 700, 800 & 900 Aircraft", Oct. 4, 2010, 3 pages, https://www.avionteq.com/document/ADA737-678-NMF.pdf, 2010.

*Primary Examiner* — Chico A Foxx

(74) *Attorney, Agent, or Firm* — Dierker & Kavanaugh, P.C.

(57) ABSTRACT

An apparatus for testing an aircraft Elevator Feel Computer (EFC) including a test box including a housing having a base and a first cover attached to the base. The apparatus includes a pressurized air delivery subsystem with an air pump disposed entirely within the base enclosure. A pressure regulator is to adjustably regulate an air pressure delivered through a regulated air port simultaneously to first and second pitot probes. The apparatus includes a two-channel pneumatic pressure measurement subsystem including first and second pressure gages connected respectively to first and second visco drains, which are connected, respectively to the first and second pitot probes. The apparatus includes a two-channel hydraulic pressure measurement subsystem including first and second hydraulic pressure displays connected respectively to first and second hydraulic transmitters, which are to connect to first and second metered pressure hydraulic inputs of a dual feel actuator from the EFC.

16 Claims, 9 Drawing Sheets

(56) References Cited

U.S. PATENT DOCUMENTS

| | | | | |
|---|---|---|---|---|
| 4,403,756 | A * | 9/1983 | Berlin | B64C 13/345 244/226 |
| 4,477,044 | A * | 10/1984 | Darcy | B64C 13/46 244/223 |
| 4,617,826 | A | 10/1986 | Hagen | |
| 4,821,217 | A * | 4/1989 | Jackson | G01M 15/05 701/32.8 |
| 5,023,791 | A | 6/1991 | Herzberg et al. | |
| 6,098,671 | A * | 8/2000 | Richardson, III | D03J 1/00 139/192 |
| 8,000,844 | B2 * | 8/2011 | Mottura | G06F 11/2236 455/66.1 |
| 9,841,304 | B2 | 12/2017 | Chong et al. | |
| 10,184,953 | B2 | 1/2019 | Wohlford | |
| 10,370,123 | B2 | 8/2019 | Porter et al. | |
| 10,401,376 | B2 * | 9/2019 | Kimmel | G01P 13/025 |
| 10,472,097 | B2 | 11/2019 | Gilday et al. | |
| 10,502,760 | B2 | 12/2019 | Cahill et al. | |
| 10,846,076 | B2 | 11/2020 | Wingate, Jr. et al. | |
| 11,300,472 | B2 | 4/2022 | Platel et al. | |
| 12,480,970 | B1 * | 11/2025 | Gilday | G01P 21/025 |
| 2011/0174921 | A1 * | 7/2011 | Fervel | B64C 13/505 244/99.2 |
| 2016/0305802 | A1 * | 10/2016 | Chong | G01P 13/025 |
| 2018/0292431 | A1 * | 10/2018 | Cahill | G01P 5/16 |
| 2024/0034485 | A1 | 2/2024 | Nativel et al. | |

* cited by examiner

AIRCRAFT ELEVATOR FEEL COMPUTER TEST APPARATUS

TECHNICAL FIELD

The present disclosure relates generally to an apparatus for testing an aircraft Elevator Feel Computer.

BACKGROUND

The Elevator Feel Computer uses the airspeed information received from dedicated pitot probes on the tail of an aircraft to control systems that resist fore/aft movement of the control column to simulate the aerodynamic forces on the elevators. The simulated aerodynamic forces allow the pilot to feel resistance to fore/aft movement of the control column as if the aerodynamic forces on the elevators were actually pushing back on the control column. In addition to the inputs from the elevator pitot system, the Elevator Feel Computer using inputs from the stabilizer position to determine the magnitude of the simulated aerodynamic forces. The rate of increase in the resistance to increased elevator angle increases with the aircraft airspeed. For example, it may take more force to pull the control column all the way back when the airspeed is high than it does to pull the control column all the way back when the airspeed is low. Thus, the pilot can feel the effect of increased speed through the control column. The resistance to movement is partially created using metered hydraulic pressure from the elevator feel computer that is sent to a dual feel actuator on the elevator feel and centering unit.

The elevator feel computer on some aircraft is not an electronic computer. Such an Elevator Feel Computer uses pneumatics, hydraulics, levers and springs to adjust and send metered hydraulic pressure output to the dual feel actuator on the elevator feel and centering unit.

Some systems on aircraft may be redundant to improve the reliability of the aircraft systems. Such systems may refer to an “A” system, generally referring to a port side of the aircraft, and a “B” system, generally referring to a starboard side of the aircraft. For example, pitot probe A is on the port side of the vertical stabilizer, and pitot probe B is on the starboard side of the vertical stabilizer.

SUMMARY

A first aspect provided herein includes an apparatus for testing an aircraft Elevator Feel Computer (EFC), comprising: a test box including a housing having a base and a first cover attached to the base; an interface panel mounted on the base to define a base enclosure; an electrical power supply interface including a power on-off switch and an electrical connector for connecting the apparatus to an electrical power cable; a pressurized air delivery subsystem including: an air pump disposed entirely within the base enclosure; a regulated air port in selectable fluid communication with the air pump, the regulated air port disposed through the interface panel; a pressure regulator to adjustably regulate an air pressure delivered through the regulated air port, the pressure regulator including a pressure regulator knob, located on the interface panel, for adjusting the air pressure delivered through the regulated air port; a pump power switch disposed on the interface panel to selectably close an electrical power circuit that delivers electrical power to the air pump and to indicate whether or not the electrical power circuit is energized; a shut off valve having a shut off valve knob disposed on the interface panel wherein the shut off valve is to selectably block the pressurized air from being delivered from the air pump to the regulated air port; and a pressure relief valve disposed on the interface panel, the pressure relief valve to selectably exhaust pressurized air in a pneumatic circuit within the base enclosure, the pneumatic circuit connected to the regulated air port; a two-channel pneumatic pressure measurement subsystem including: a first air inlet connector disposed on the interface panel, the first air inlet connector to connect to a first visco drain in fluid communication with the first pitot probe; a first pneumatic circuit to fluidically connect the first air inlet connector to a first pitot pressure gage to indicate a first pneumatic pressure in the first pneumatic circuit; a second air inlet connector disposed on the interface panel, the second air inlet connector to connect to a second visco drain in fluid communication with a second pitot probe; and a second pneumatic circuit to fluidically connect the second air inlet connector to a second pitot pressure gage to indicate a second pneumatic pressure in the second pneumatic circuit; a two-channel hydraulic pressure measurement subsystem including: a first electrical connector disposed on the interface panel, the first electrical connector to connect to a first hydraulic transmitter; a first electrical circuit defined within the base enclosure to electrically connect the first electrical connector to a first hydraulic pressure display to indicate a first hydraulic pressure; a second electrical connector disposed on the interface panel, the second electrical connector to connect to a second hydraulic transmitter; and a second electrical circuit to electrically connect the second electrical connector to a second hydraulic pressure display to indicate a second hydraulic pressure.

In examples of the apparatus, the pressurized air delivery subsystem further comprises: a first pitot probe adapter to connect to a first pitot probe wherein the first pitot probe adapter is to reversibly form a pressure tight connection with the first pitot probe; a second pitot probe adapter to connect to a second pitot probe wherein the second pitot probe adapter is to reversibly form a pressure tight connection with the second pitot probe; and a pitot hose assembly including an air input hose, a T-fitting connected to the air input hose, a first pitot adapter hose to connect the T-fitting and the first pitot probe adapter, and a second pitot adapter hose to connect the T-fitting and the second pitot probe adapter, wherein the pressurized air delivery system is to deliver pressurized air simultaneously to the first pitot probe and the second pitot probe.

In examples of the apparatus, the first pitot pressure gage and the second pitot pressure gage each include a liquid crystal display (LCD) and the first pitot pressure gage and the second pitot pressure gage each have an operating span of 0 psig to 10 psig with an accuracy within 0.1 percent of the operating span.

In examples of the apparatus, the pneumatic pressure measurement subsystem further comprises: a first pressure return hose assembly to fluidically connect the first air inlet connector to the first visco drain; and a second pressure return hose assembly to fluidically connect the second air inlet connector to the second visco drain.

In examples, the apparatus, further comprises: a first hydraulic signal cable to connect the first electrical connector to the first hydraulic transmitter; and a second hydraulic signal cable to connect the second electrical connector to the second hydraulic transmitter.

In examples of the apparatus, the first hydraulic transmitter is to fluidically connect to a first metered pressure hydraulic input of a dual feel actuator from the EFC to measure the first hydraulic pressure and transmit a signal indicative of the first hydraulic pressure; and the second hydraulic transmitter is to fluidically connect to a second metered pressure hydraulic input of the dual feel actuator from the EFC to measure a second hydraulic pressure and transmit a signal indicative of the second hydraulic pressure.

In examples of the apparatus, the first hydraulic transmitter is to be connected to a first hydraulic T-connector in fluid communication with the first metered pressure hydraulic input of the dual feel actuator from a first metered pressure hydraulic output of the EFC; a first metered pressure hydraulic line is to remain connected between the first metered pressure hydraulic output of the EFC and the first metered pressure hydraulic input of the dual feel actuator during operation of the apparatus; the second hydraulic transmitter is to be connected to a second hydraulic T-connector in fluid communication with the second metered pressure hydraulic input of the dual feel actuator from a second metered pressure hydraulic output of the EFC; and a second metered pressure hydraulic line is to remain connected between the second metered pressure hydraulic output of the EFC and the second metered pressure hydraulic input of the dual feel actuator during the operation of the apparatus.

In examples of the apparatus, the first hydraulic transmitter is to be connected to a first metered pressure hydraulic line in fluid communication with the first metered pressure hydraulic output of the EFC; the first metered pressure hydraulic line is to remain connected to the first metered pressure hydraulic output of the EFC during operation of the apparatus; the first metered pressure hydraulic line is to be disconnected from the first metered pressure hydraulic input of the dual feel actuator during operation of the apparatus; the first metered pressure hydraulic input of the dual feel actuator is to be capped during operation of the apparatus; the second hydraulic transmitter is to be connected to a second metered pressure hydraulic line in fluid communication with the second metered pressure hydraulic output of the EFC; the second metered pressure hydraulic line is to remain connected to the second metered pressure hydraulic output of the EFC during operation of the apparatus; the second metered pressure hydraulic line is to be disconnected from the second metered pressure hydraulic input of the dual feel actuator during operation of the apparatus; and the second metered pressure hydraulic input of the dual feel actuator is to be capped during operation of the apparatus.

In examples, the apparatus further comprises: at least one tethered dust cap assembly having a dust cap and a tether connected to the dust cap wherein the tether is to be fastened to the interface panel to retain the dust cap when the dust cap is removed from a coverable connector, wherein the coverable connector includes at least one of: the regulated air port, the first air inlet connector, the second air inlet connector, the first electrical connector, or the second electrical connector.

In examples of the apparatus, at least one of the first hydraulic transmitter or the second hydraulic transmitter comprises: a hydraulic pressure transducer having an operating pressure range from about 0 psi to about 3000 psi; a hydraulic connector having ¼ inch male National Pipe Thread (NPT) threads; an electrical connector having 4 pins; and a signal output range from about 4 mA to about 20 mA.

In examples of the apparatus, the test box further comprises: a first hinge to attach the first cover to the base; a latch to selectably secure the first cover to the base in a sealed configuration; and a test box handle attached to the test box to facilitate lifting and carrying the test box, wherein the housing fits in a space that is about 14 inches long, about 12 inches wide, and about 6 inches tall to facilitate setup and operation of the test box in an aft galley of an airliner.

It is to be understood that any elements of this first aspect disclosed herein may be combined together in any desirable manner and/or configuration.

A second aspect provided herein includes an aircraft Elevator Feel Computer (EFC) test kit, comprising: a rigid case having: a bin; a second cover attached to the bin by a second hinge; a second latch to selectably secure the second cover to the bin in a closed configuration; a test kit case handle attached to the rigid case; and a pair of wheels attached to the rigid case, wherein the rigid case fits in a space that is about 32 inches long, about 21 inches wide, and about 12 inches tall to facilitate setup of the EFC test kit in an aft galley of an airliner; a test box including: a housing having a base; a first cover attached to the base; a first hinge to attach the first cover to the base; a latch to selectably secure the first cover to the base in a sealed configuration; a test box handle attached to the test box to facilitate lifting and carrying the test box, wherein the housing fits in a space that is about 14 inches long, about 12 inches wide, and about 6 inches tall to facilitate setup and operation of the test box in an aft galley of an airliner; an interface panel mounted on the base to define a base enclosure; an electrical power supply interface including a power on-off switch and an electrical connector for connecting the apparatus to an electrical power cable; a two-channel pneumatic pressure measurement subsystem including: a first air inlet connector disposed on an interface panel, the first air inlet connector to connect to a first visco drain in fluid communication with a first pitot probe; a second air inlet connector disposed on the interface panel, the second air inlet connector to connect to a second visco drain in fluid communication with a second pitot probe; a two-channel hydraulic pressure measurement subsystem including: a first electrical connector disposed on the interface panel, the first electrical connector to connect to a first hydraulic transmitter; a first electrical circuit defined within the base enclosure to electrically connect the first electrical connector to a first hydraulic pressure display to indicate a first hydraulic pressure; a second electrical connector disposed on the interface panel, the second electrical connector to connect to a second hydraulic transmitter; and a second electrical circuit to electrically connect the second electrical connector to a second hydraulic pressure display to indicate a second hydraulic pressure; the electrical power cable; a pitot hose assembly including: an air input hose; a T-fitting connected to the air input hose; a first pitot adapter hose to connect the T-fitting and a first pitot probe adapter, wherein the first pitot probe adapter is to connect to the first pitot probe wherein the first pitot probe adapter is to reversibly form a pressure tight connection with the first pitot probe; and a second pitot adapter hose to connect the T-fitting and a second pitot probe adapter, wherein the second pitot probe adapter is to connect to the second pitot probe, wherein the second pitot probe adapter is to reversibly form a pressure tight connection with the second pitot probe wherein a pressurized air delivery system is to deliver pressurized air simultaneously to the first pitot probe and the second pitot probe via the pitot hose assembly; a first pressure return hose assembly to fluidically connect the first air inlet connector to the first visco drain and a second pressure return hose assembly to fluidically connect the second air inlet connector to the second visco drain; a first hydraulic signal cable to connect the first electrical connector to the first hydraulic transmitter, and a second hydraulic signal cable to connect the second electrical connector to the second hydraulic transmitter; a hose grip assembly having a suction cup and hose retainer to support hoses in an organized arrangement during setup and operation of the test box; the first pitot probe adapter and the second pitot probe adapter; a first pretest pin and a second pretest pin for installing in the first pitot probe adapter or the second pitot probe adapter to isolate a suspected leak during operation of the test box; the first hydraulic transmitter and the second hydraulic transmitter; and a bottle of lubrication fluid for lubricating the first pitot probe adapter and the second pitot probe adapter, wherein the elements of the test kit, other than the rigid case, fit entirely within the rigid case when the first cover is latched to the bin in the closed configuration.

It is to be understood that any elements of this second aspect disclosed herein may be combined together in any desirable manner and/or configuration.

A third aspect provided herein includes a method of using the apparatus for testing the aircraft Elevator Feel Computer (EFC) as defined herein above, comprising: pressurizing the aircraft hydraulic systems using an electric motor driven pump or an engine-driven pump of the aircraft; loosening the pressure regulator knob by turning the pressure regulator knob counterclockwise until the pressure regulator knob spins freely; pushing the shut off valve knob toward the interface panel to open the shut off valve; energizing the test box with the power on-off switch; energizing the air pump with the pump power switch; observing the first pitot pressure gage and the second pitot pressure gauge simultaneously; slowly tightening the pressure regulator knob until the first pitot pressure gage and the second pitot pressure gauge each read a first target pitot pressure; determining if one of the first pitot pressure gage or the second pitot pressure gage rises more slowly than the other, wherein a slow rising pressure in the first pitot pressure gage or the second pitot pressure gage is indicative of a restriction in the system corresponding to the slow rising pressure gage; comparing the first hydraulic pressure indicated on the first hydraulic pressure display and the second hydraulic pressure indicated on the second hydraulic pressure display; determining if one of the first hydraulic pressure or the second hydraulic pressure is lower than the other by more than 20 percent, wherein a lower hydraulic pressure is indicative of a restriction in the system corresponding to the lower hydraulic pressure; pulling the shut off valve knob fully in the direction away from the interface panel to close the shut off valve; observing the first pitot pressure gage and the second pitot pressure gauge simultaneously; determining if one of the first pitot pressure gage or the second pitot pressure gage decreases by more than a maximum allowable pressure decay amount over a two minute time interval that begins with the pulling of the shut off valve knob, wherein a loss of more than the maximum allowable pressure decay amount over the two minute time interval is indicative of a leak; and loosening the pressure regulator knob by turning the pressure regulator knob counterclockwise until the first pitot pressure gage and the second pitot pressure gage read within a lower pressure target range, and waiting for the pressure to stabilize before continuing to the next step.

In examples of the a method of using the apparatus for testing the aircraft Elevator Feel Computer (EFC), the first target pitot pressure is about 2.5 psig.

In examples of the a method of using the apparatus for testing the aircraft Elevator Feel Computer (EFC), the pitot pressure lower target range is about 0.09 psig and about 0.16 psig.

In examples of the a method of using the apparatus for testing the aircraft Elevator Feel Computer (EFC), the maximum allowable pressure decay amount is about 0.2 psig over a 2 minute time interval.

It is to be understood that any elements of this third aspect disclosed herein may be combined together in any desirable manner and/or configuration.

It is to be understood that any combination of features from an apparatus disclosed herein (first aspect), and/or from the kits disclosed herein (second aspect), and/or from the methods disclosed herein (third aspect) may be used together, and/or that any features from any or all of these aspects may be combined with any of the features of the examples disclosed herein to achieve the benefits as described in this disclosure.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The aircraft Elevator Feel Computer (EFC) test apparatus and method disclosed herein provide advantages over some existing test equipment and methods. Examples of the aircraft EFC test apparatus and method of the present disclosure are relatively compact, develop pressure using an electric powered pump, and allow operators to reduce time working near operating aircraft engines and in adverse weather conditions. An aspect of the present disclosure that contributes to the relatively compact size includes housing all gages and pumps are in a single, compact test box. Some existing EFC test systems and methods may use two or more separate boxes for testing. The apparatus disclosed herein is electrically powered using electrical power available in an aft galley of the aircraft. Some existing systems use an external propane tank-which is properly transported under hazmat regulations. While operating some existing EFC test systems according to existing methods, technicians stand outside of the aircraft. More specifically, technicians that operate according to existing methods may stand outside of the aircraft, aft of operating aircraft engines where the technicians may be exposed to jet exhaust and weather conditions. In contrast to the existing EFC test systems and methods, aspects of the apparatus and method of the present disclosure can be operated by a technician in the aft galley of the aircraft. Further, aspects of the apparatus and method disclosed herein may advantageously allow easy, side-by-side comparison of data, (e.g. pressure data) from the A and B sides of the Elevator Feel Computer and related aircraft systems. In an aspect, pressure control of both the A and B sides of the test apparatus may be accomplished by turning a single regulator knob that is mounted in close proximity to A and B side pneumatic and hydraulic pressure gages, thereby eliminating some potential error sources from the existing EFC test systems and methods that may include two or more separate boxes connected to an external propane tank.

Figure 1:
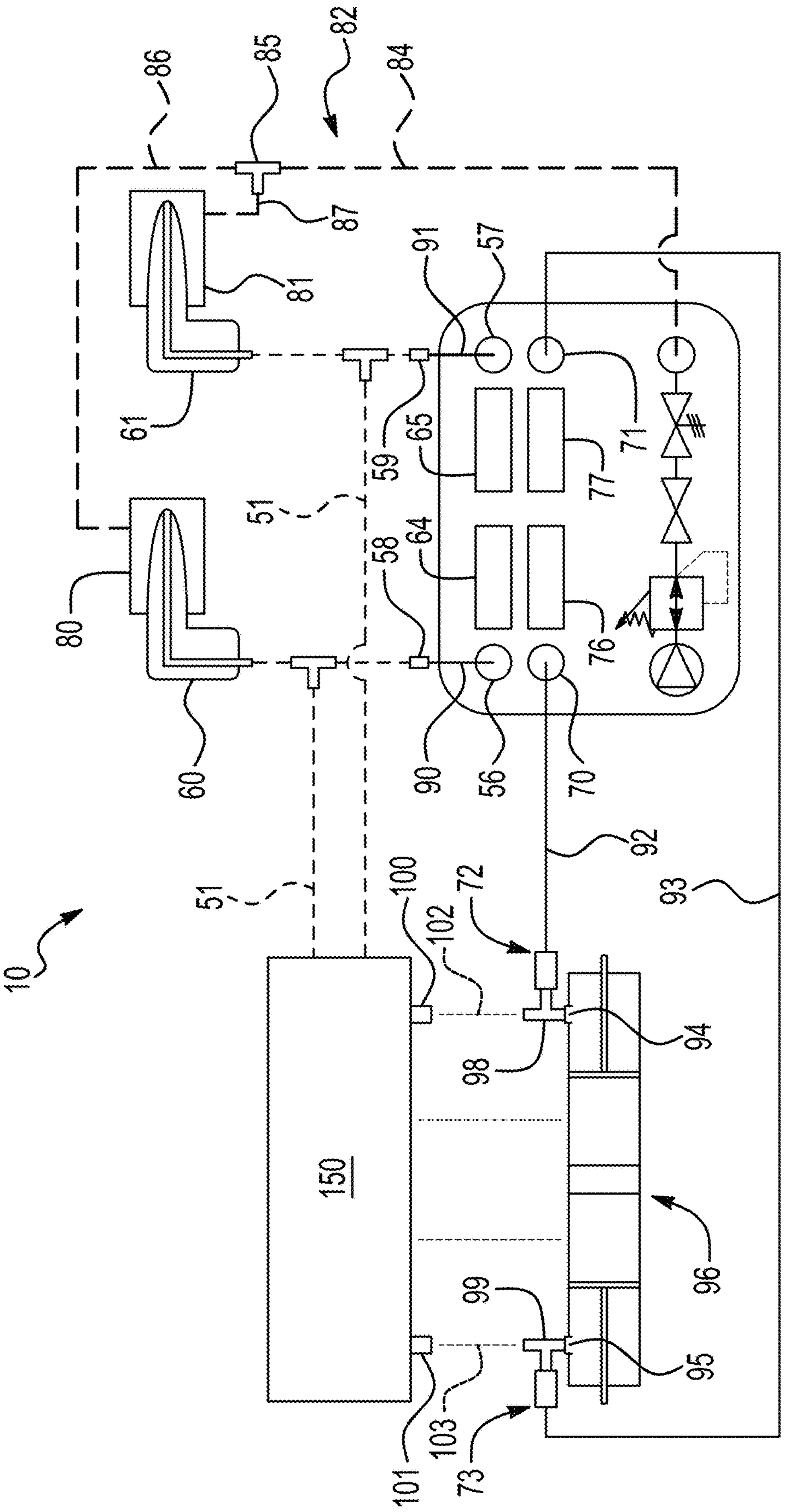
FIG. 1 is a semi-schematic interface diagram depicting connections for the test box and an aircraft Elevator Feel System according to the present disclosure.

As depicted in FIG. 1, an apparatus 10 for testing an aircraft Elevator Feel Computer (EFC) may include a test box 12. (See FIG. 3.) The test box 12, may include a housing 14 that has a base 16 and a first cover 18 attached to the base 16. An interface panel 20 may be mounted on the base 16 to define a base enclosure 22. (See FIG. 10.) The test box 12 may include an electrical power supply interface 24 disposed on the interface panel 20. The electrical power supply interface 24 may include a power on-off switch 26 and an electrical connector 28 for connecting the apparatus 10 to an electrical power cable 30. (See FIG. 6.)

Figure 2:
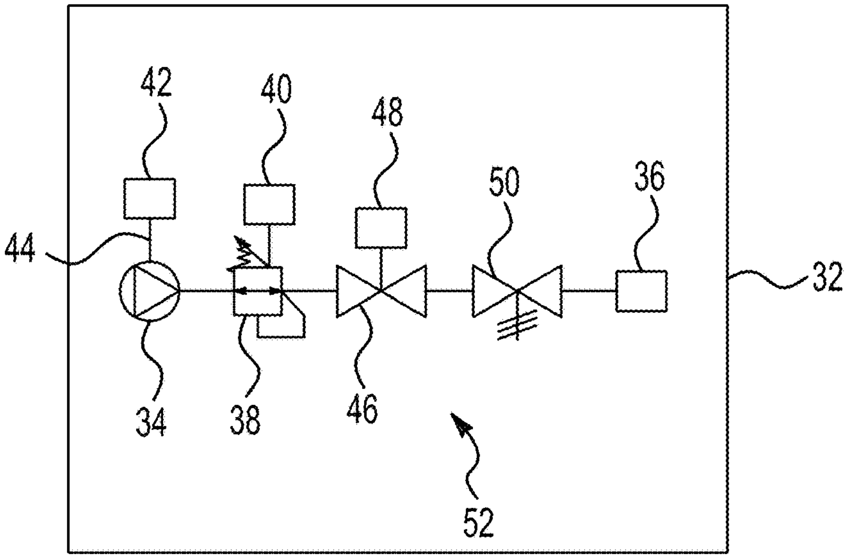
FIG. 2 is a schematic diagram depicting a pressurized air delivery subsystem according to the present disclosure.

As depicted in FIG. 1 and FIG. 2, the test box 12 may include a pressurized air delivery subsystem 32. The pressurized air delivery subsystem 32 may include an air pump 34 disposed entirely within the base enclosure 22. The regulated air port 36 may be in selectable fluid communication with the air pump 34. The regulated air port 36 may be disposed through the interface panel 20. A pressure regulator 38 is to adjustably regulate an air pressure delivered through the regulated air port 36. The pressure regulator 38 may include a pressure regulator knob 40, located on the interface panel 20, for adjusting the air pressure delivered through the regulated air port 36. A pump power switch 42 may be disposed on the interface panel 20 to selectably close an electrical power circuit 44 that delivers electrical power to the air pump 34 and to indicate whether or not the electrical power circuit 44 is energized. A shut off valve 46 may have a shut off valve knob 48 disposed on the interface panel 20. The shut off valve 46 may be to selectably block the pressurized air from being delivered from the air pump 34 to the regulated air port 36. A pressure relief valve 50 may be disposed on the interface panel 20. The pressure relief valve 50 may be to selectably exhaust pressurized air in a pneumatic circuit 52 within the base enclosure 22. The pneumatic circuit 52 may be connected to the regulated air port 36.

In FIG. 1, the line fonts convey information as detailed in Table 1 below:

TABLE 1

| Description | Line Font | Reference Numeral Example(s) |
|---|---|---|
| test system transmitters and electrical wires | Solid lines | 90, 91, 92, 93 |
| Aircraft hydraulic network | Small dash | 102, 103 |
| Aircraft pneumatic network | Medium dash | 51 |
| Test system pneumatic hoses | Large dash | 84, 86, 87 |

Figure 6:
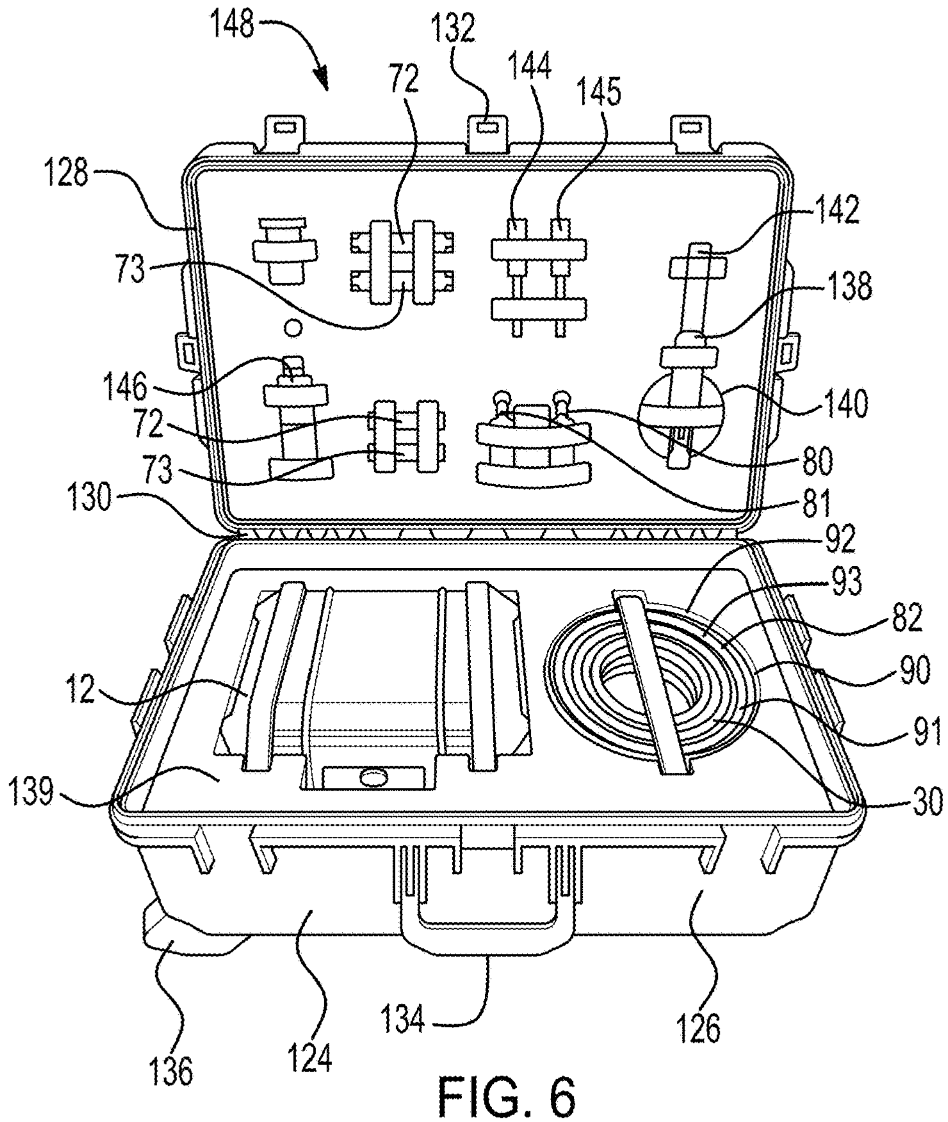
FIG. 6 is a drawing of an example of an Elevator Feel Computer test kit according to the present disclosure.

Note that the terms "small," "medium," and "large" in describing the dashes in the line font are to be considered relative to each other in FIG. 1. An example of how to use Table 1 and FIG. 1 together is: in FIG. 1, some existing aircraft pneumatic tubes 51 are depicted in a medium dash line font. As such, FIG. 1 shows how to connect hoses, sensors, and electrical lines that are in the EFC test kit 148 (FIG. 6).

Figure 3:
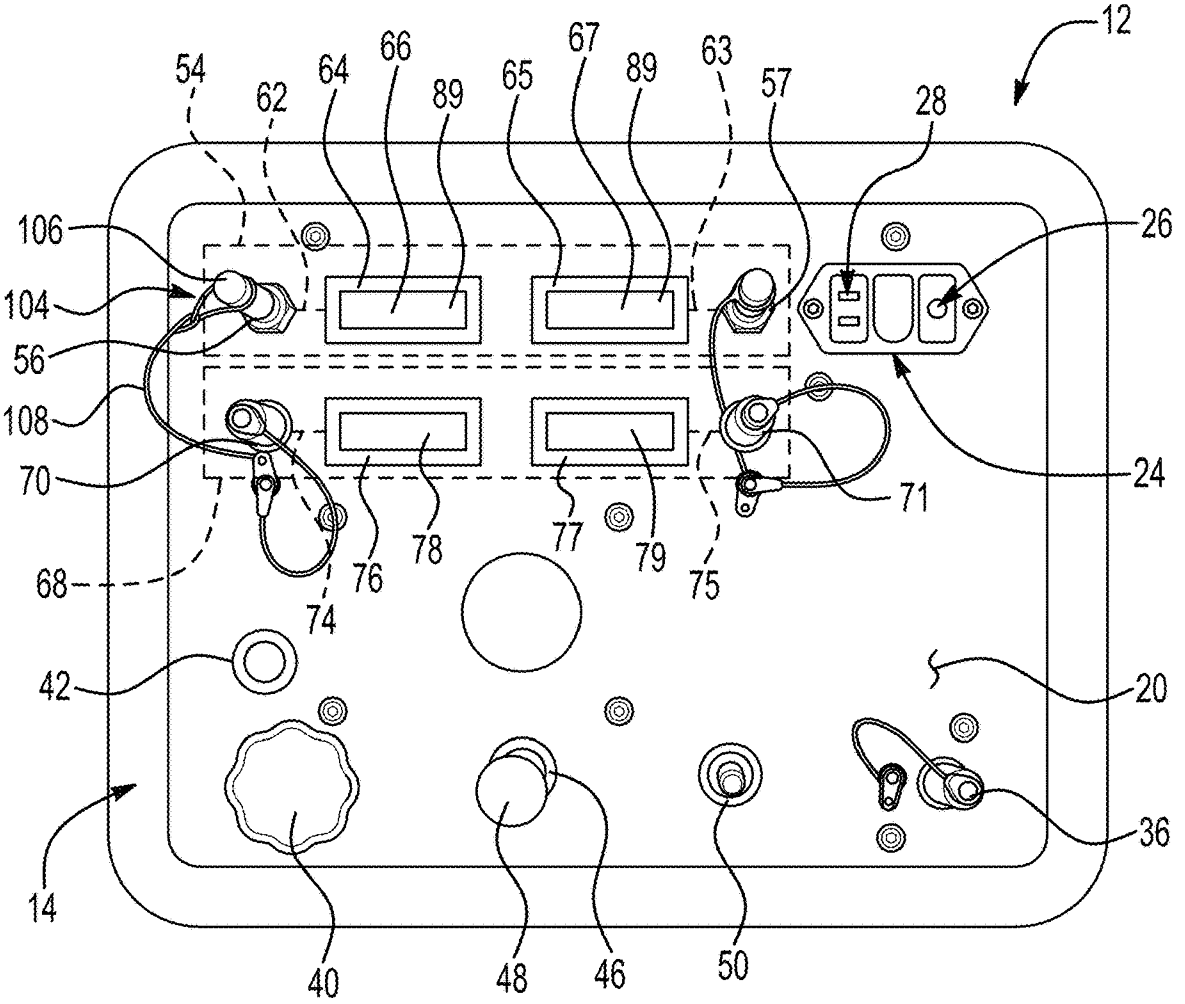
FIG. 3 is a top view of an example of an interface panel of a test box according to the present disclosure.

As depicted in FIG. 3, the test box 12 may include a two-channel pneumatic pressure measurement subsystem 54. The two-channel pneumatic pressure measurement subsystem 54 may include a first air inlet connector 56 disposed on the interface panel 20. The first air inlet connector 56 may be to connect to a first visco drain 58 (FIG. 1) in fluid communication with the first pitot probe 60 (FIG. 1). A first pneumatic circuit 62 (FIG. 3) may be to fluidically connect the first air inlet connector 56 to a first pitot pressure gage 64 to indicate a first pneumatic pressure 66 in the first pneumatic circuit 62. A second air inlet connector 57 may be disposed on the interface panel 20. The second air inlet connector 57 may be to connect to a second visco drain 59 (FIG. 1) in fluid communication with a second pitot probe 61 (FIG. 1). A second pneumatic circuit 63 (FIG. 3) may be to fluidically connect the second air inlet connector 57 to a second pitot pressure gage 65 to indicate a second pneumatic pressure 67 in the second pneumatic circuit 63.

A two-channel hydraulic pressure measurement subsystem 68 (FIG. 1) may include a first electrical connector 70 disposed on the interface panel 20. The first electrical connector 70 may be to connect to a first hydraulic transmitter 72. A first electrical circuit 74 may be defined within the base enclosure 22 to electrically connect the first electrical connector 70 to a first hydraulic pressure display 76 (FIG. 3) to indicate a first hydraulic pressure 78. A second electrical connector 71 may be disposed on the interface panel 20. The second electrical connector 71 may be to connect to a second hydraulic transmitter 73. A second electrical circuit 75 may be defined within the base enclosure 22 to electrically connect the second electrical connector 71 to a second hydraulic pressure display 77 (FIG. 3) to indicate a second hydraulic pressure 79.

In some examples of the apparatus 10 (FIG. 1), the pressurized air delivery subsystem 32 (FIG. 2) may further include a first pitot probe adapter 80 (FIG. 1) to connect to a first pitot probe 60. The first pitot probe adapter 80 may be to reversibly form a pressure tight connection with the first pitot probe 60. A second pitot probe adapter 81 may be to connect to a second pitot probe 61. The second pitot probe adapter 81 may be to reversibly form a pressure tight connection with the second pitot probe 61.

In examples, a pitot hose assembly 82 (FIG. 2) may include an air input hose 84 and a T-fitting 85 (FIG. 1) connected to the air input hose 84. The pitot hose assembly 82 may include a first pitot adapter hose 86 to connect the t-fitting 85 and the first pitot probe adapter 80. The pitot hose assembly 82 may further include a second pitot adapter hose 87 to connect the T-fitting 85 and the second pitot probe adapter 81. The pressurized air delivery system may be to deliver pressurized air simultaneously to the first pitot probe 60 and the second pitot probe 61.

In examples of the apparatus 10, the first pitot pressure gage 64 (FIG. 3) and the second pitot pressure gage 65 each include a respective liquid crystal display (LCD) 89. The first pitot pressure gage 64 and the second pitot pressure gage 65 may each have an operating span of 0 psig to 10 psig with an accuracy within 0.1 percent of the operating span.

In examples of the apparatus 10, the pneumatic pressure measurement subsystem 54 (FIG. 3) may include a first pressure return hose assembly 90 (FIG. 1) to fluidically connect the first air inlet connector 56 to the first visco drain 58. The pneumatic pressure measurement subsystem 54 may further include a second pressure return hose assembly 91 to fluidically connect the second air inlet connector 57 to the second visco drain 59.

In examples, the apparatus 10 may include a first hydraulic signal cable 92 (FIG. 1) to connect the first electrical connector 70 to the first hydraulic transmitter 72. The apparatus 10 may include a second hydraulic signal cable 93 to connect the second electrical connector 71 to the second hydraulic transmitter 73.

In examples of the apparatus 10, the first hydraulic transmitter 72 (FIG. 1) is to fluidically connect to a first metered pressure hydraulic input 94 of a dual feel actuator 96 from the EFC 150 to measure the first hydraulic pressure 78 (FIG. 3) and transmit a signal indicative of the first hydraulic pressure 78. The second hydraulic transmitter 73 may be to fluidically connect to a second metered pressure hydraulic input 95 of the dual feel actuator 96 from the EFC to measure a second hydraulic pressure 79 and transmit a signal indicative of the second hydraulic pressure 79.

In examples of the apparatus 10, the first hydraulic transmitter 72 may be connected to a first hydraulic T-connector 98 in fluid communication with the first metered pressure hydraulic input 94 of the dual feel actuator 96 from a first metered pressure hydraulic output 100 of the EFC 150. A first metered pressure hydraulic line 102 may be to remain connected between the first metered pressure hydraulic output 100 of the EFC 150 and the first metered pressure hydraulic input 94 of the dual feel actuator 96 during operation of the apparatus 10. The second hydraulic transmitter 73 may be connected to a second hydraulic T-connector 99 in fluid communication with the second metered pressure hydraulic input 95 of the dual feel actuator 96 from a second metered pressure hydraulic output 101 of the EFC. A second metered pressure hydraulic line 103 may be to remain connected between the second metered pressure hydraulic output 101 of the EFC and the second metered pressure hydraulic input 95 of the dual feel actuator 96 during the operation of the apparatus 10.

In examples of the apparatus 10, the first hydraulic transmitter 72 is to be connected to a first metered pressure hydraulic line 102 in fluid communication with the first metered pressure hydraulic output 100 of the EFC 150. The first metered pressure hydraulic line 102 may be to remain connected to the first metered pressure hydraulic output 100 of the EFC 150 during operation of the apparatus 10. The first metered pressure hydraulic line 102 may be disconnected from the first metered pressure hydraulic input 94 of the dual feel actuator 96 during operation of the apparatus 10. The first metered pressure hydraulic input 94 of the dual feel actuator 96 may be capped during operation of the apparatus 10. The second hydraulic transmitter 73 may be connected to a second metered pressure hydraulic line 103 in fluid communication with the second metered pressure hydraulic output 101 of the EFC. The second metered pressure hydraulic line 103 may be to remain connected to the second metered pressure hydraulic output 101 of the EFC during operation of the apparatus 10. In some examples, the second metered pressure hydraulic line 103 may be disconnected from the second metered pressure hydraulic input of the dual feel actuator 96 during operation of the apparatus 10. The second metered pressure hydraulic input of the dual feel actuator 96 may be capped during operation of the apparatus 10.

In examples, the apparatus 10 may further include at least one tethered dust cap assembly 104 having a dust cap 106 and a tether 108 connected to the dust cap 106. The tether 108 may be fastened to the interface panel 20 to retain the dust cap 106 when the dust cap 106 is removed from a coverable connector. The coverable connector may include at least one of: the regulated air port 36, the first air inlet connector 56, the second air inlet connector 57, the first electrical connector 70, or the second electrical connector 71.

Figure 11:
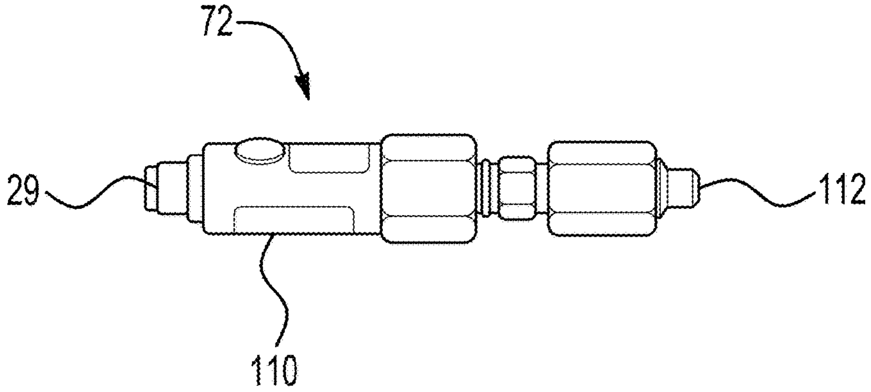
FIG. 11 is a side view of an example of a hydraulic transmitter according to the present disclosure.

In examples of the apparatus 10, at least one of the first hydraulic transmitter 72 or the second hydraulic transmitter 73 includes a hydraulic pressure transducer 110 (FIG. 11) having an operating pressure range from about 0 psi to about 3000 psi; a hydraulic connector 112 having ¼ inch male National Pipe Thread (NPT) threads; an electrical connector 29 having 4 pins; and a signal output range from about 4 mA to about 20 mA.

Figure 4:
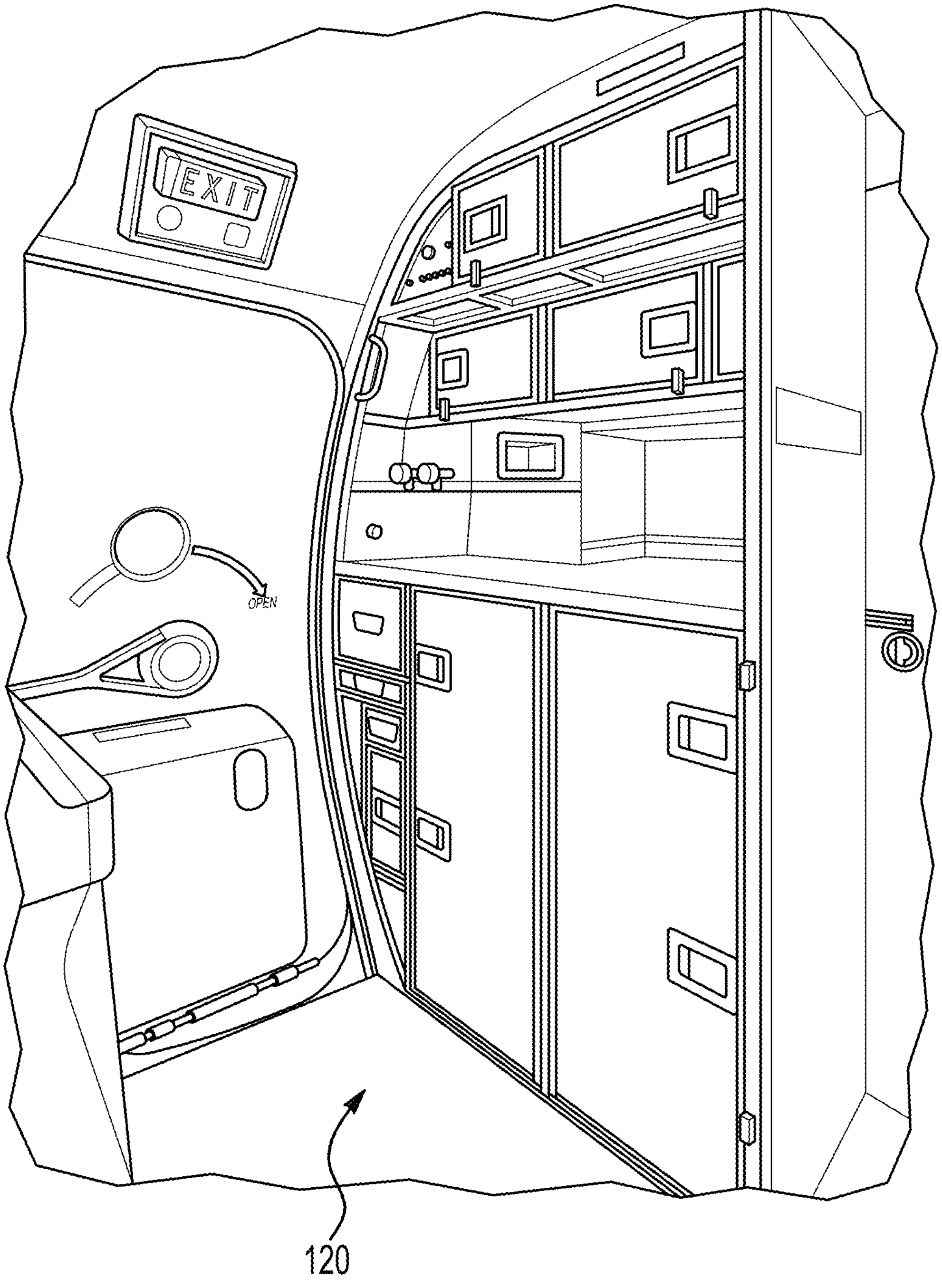
FIG. 4 is a drawing of an aft starboard side of an aft galley of a 737 aircraft.
Figure 5:
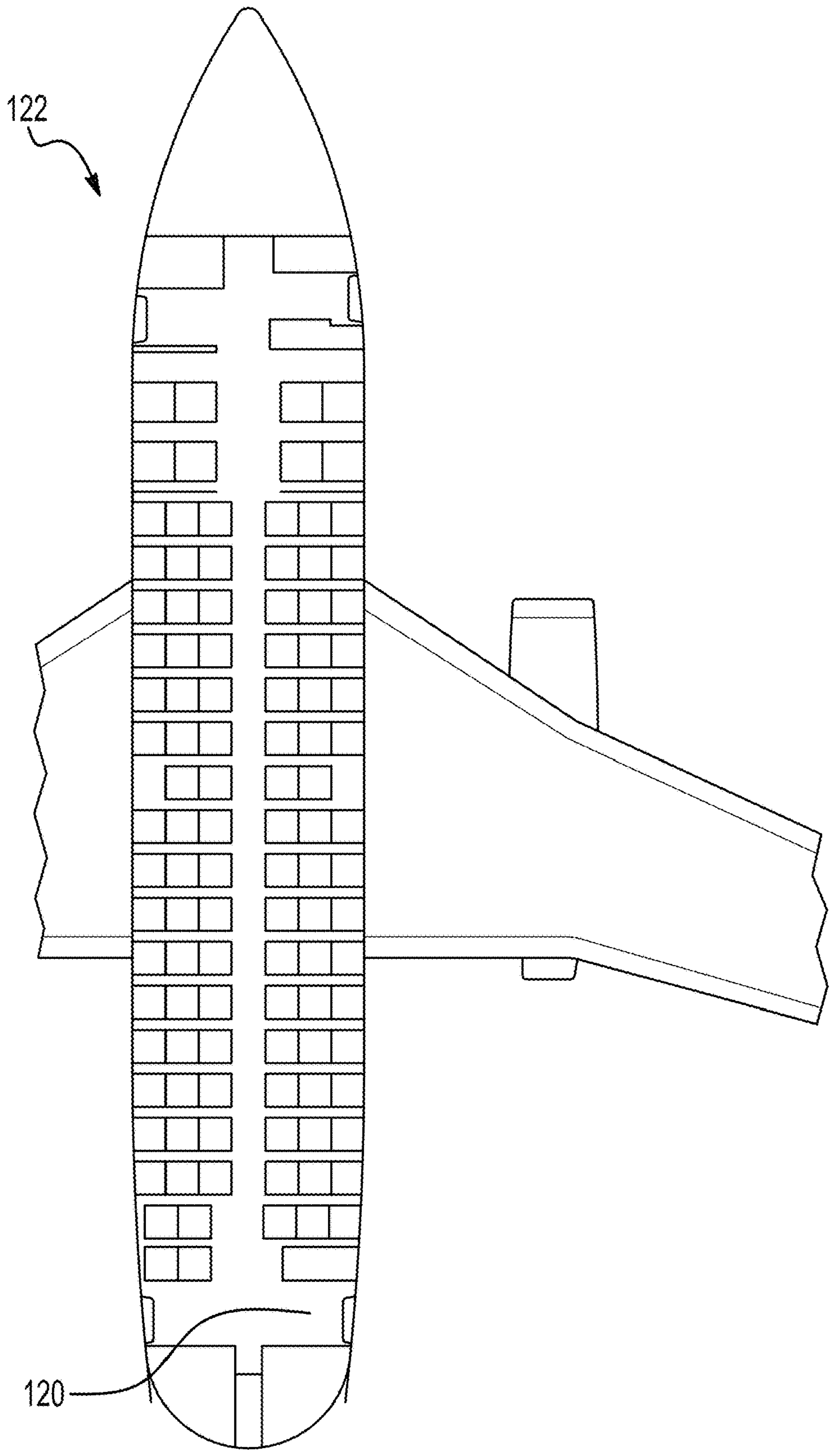
FIG. 5 is a diagram depicting seat and galley locations on an example of a 737-200 aircraft.
Figure 10:
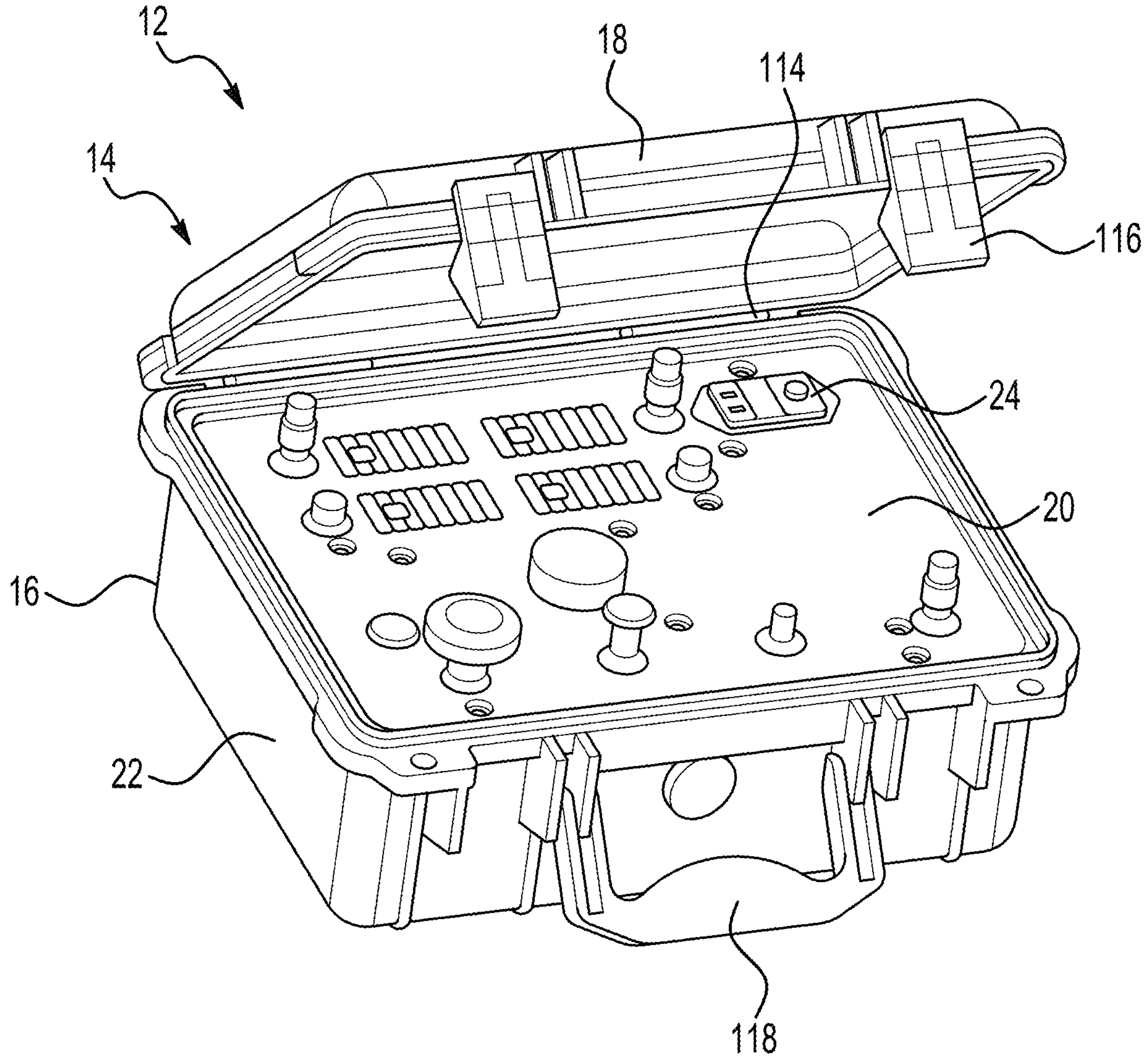
FIG. 10 is a perspective view of an example of a test box according to the present disclosure, with the cover partially open.

As depicted in FIG. 10, in examples of the apparatus 10, the test box 12 may further include: a first hinge 114 to attach the first cover 18 to the base 16; a latch 116 to selectably secure the first cover 18 to the base 16 in a sealed configuration; a test box handle 118 attached to the test box 12 to facilitate lifting and carrying the test box 12. The housing 14 may fit in a space that is about 14 inches long, about 12 inches wide, and about 6 inches tall to facilitate setup and operation of the test box 12 in an aft galley 120 of an airliner 122. (See FIG. 4 and FIG. 5.)

As depicted in FIG. 6, the test box 12 may be included in an aircraft Elevator Feel Computer (EFC) test kit 148. The EFC test kit 148 may include a rigid case 124 having a bin 126. A second cover 128 may be attached to the bin 126 by a second hinge 130. A second latch 132 may be to selectably secure the second cover 128 to the bin 126 in a closed configuration. A test kit case handle 134 may be attached to the rigid case 124. A pair of wheels 136 may be attached to the rigid case 124. The rigid case 124 may fit in a space that is about 32 inches long, about 21 inches wide, and about 12 inches tall to facilitate setup of the EFC test kit 148 in an aft galley 120 of an airliner 122.

As shown in FIG. 6, EFC test kit 148 may include the test box 12 and the pitot hose assembly 82 as disclosed herein. The EFC test kit 148 may further include the first pressure return hose assembly 90 and the second pressure return hose assembly 91 as disclosed herein. The EFC test kit 148 may include the first hydraulic signal cable 92 and the second hydraulic signal cable 93 as disclosed herein. The EFC test kit 148 may include the electrical power cable 30 as disclosed herein. The EFC test kit 148 may include a hose grip assembly 138 having a suction cup 140 and hose retainer 142 to support hoses in an organized arrangement during setup and operation of the EFC test kit 148. The EFC test kit 148 may further include the first pitot probe adapter 80 and the second pitot probe adapter 81 as disclosed herein. The EFC test kit 148 may further include a first pretest pin 144 and a second pretest pin 145 for installing in the first pitot probe adapter 80 or the second pitot probe adapter 81 to isolate a suspected leak during operation of the EFC test kit 148. The EFC test kit 148 may further include the first hydraulic transmitter 72 and the second hydraulic transmitter 73 as disclosed herein. The EFC test kit 148 may further include a bottle of lubrication fluid 146 for lubricating the first pitot probe adapter 80 and the second pitot probe adapter 81. The elements of the EFC test kit 148, other than the rigid case 124, fit entirely within the rigid case 124 when the first cover 18 is latched to the bin 126 in the closed configuration. The EFC test kit 148 may further include foam 139 to cushion the elements of the EFC test kit 148.

Figure 8:
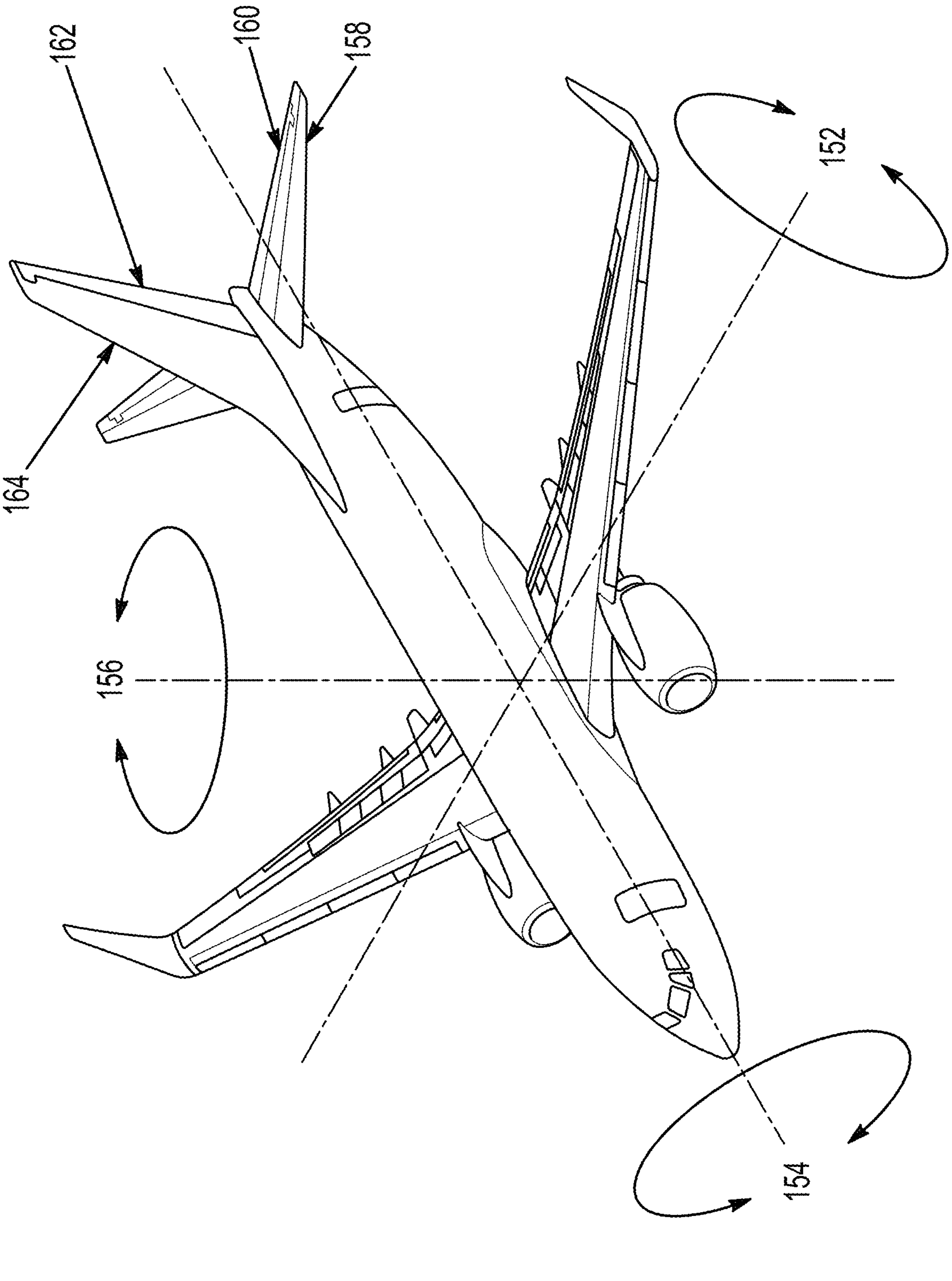
FIG. 8 is a diagram depicting certain control surfaces of a Boeing 737 aircraft.
Figure 9:
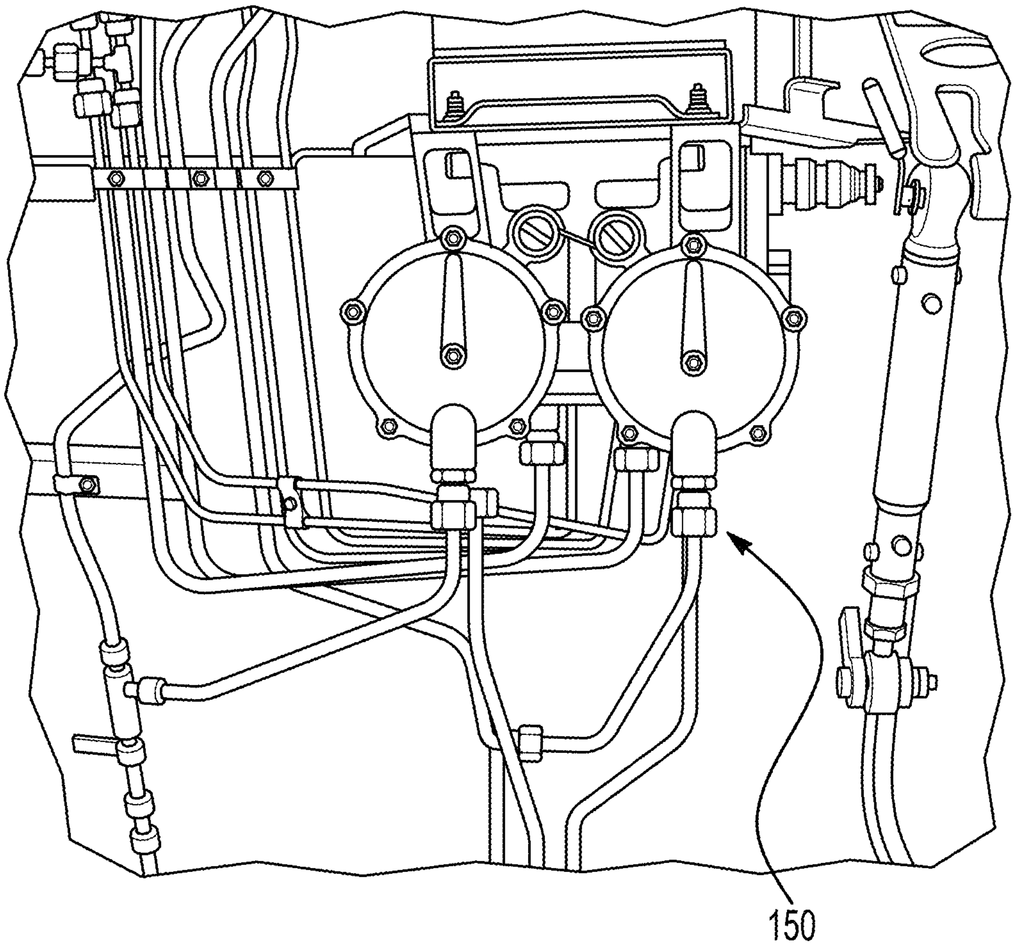
FIG. 9 is a view of an Elevator Feel Computer mounted in a 737 aircraft.

FIG. 8 is a diagram depicting certain control surfaces of a Boeing 737 aircraft. Table 2 provides reference numerals and names for control surfaces and elements depicted in FIG. 8.

TABLE 2

| Reference Numeral | Description |
|---|---|
| 152 | Pitch Axis |
| 154 | Roll Axis |
| 156 | Yaw Axis |
| 158 | Horizontal Stabilizer |
| 160 | Elevator |
| 162 | Rudder |
| 164 | Vertical Stabilizer |

An aspect provided herein includes a method of using the apparatus 10 for testing the aircraft Elevator Feel Computer (EFC) as defined herein above. The method may include:

TABLE 3

Example Test Preparation

Remove Pressure from the Elevator Hydraulic Systems A and B.
Open these access panels:

| Number | Name/Location |
|---|---|
| 318BR | Tail cone Access Door |
| 311BL | Stabilizer Trim Access Door |

Open these circuit breakers and install safety tags:

| Row | Col | Number | |
|---|---|---|---|
| C | 4 | C00236 | HEATERS ELEV PITOT LEFT |
| C | 4 | C00237 | HEATERS ELEV PITOT RIGHT |

Figure 7:
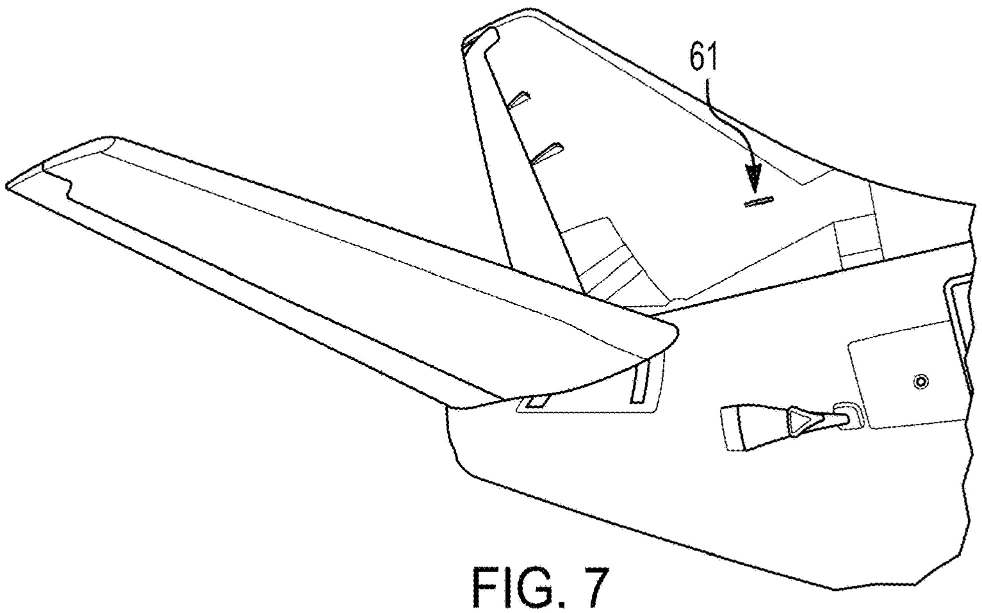
FIG. 7 is a view of a starboard side of a tail of a 737 aircraft.
Figure 12:
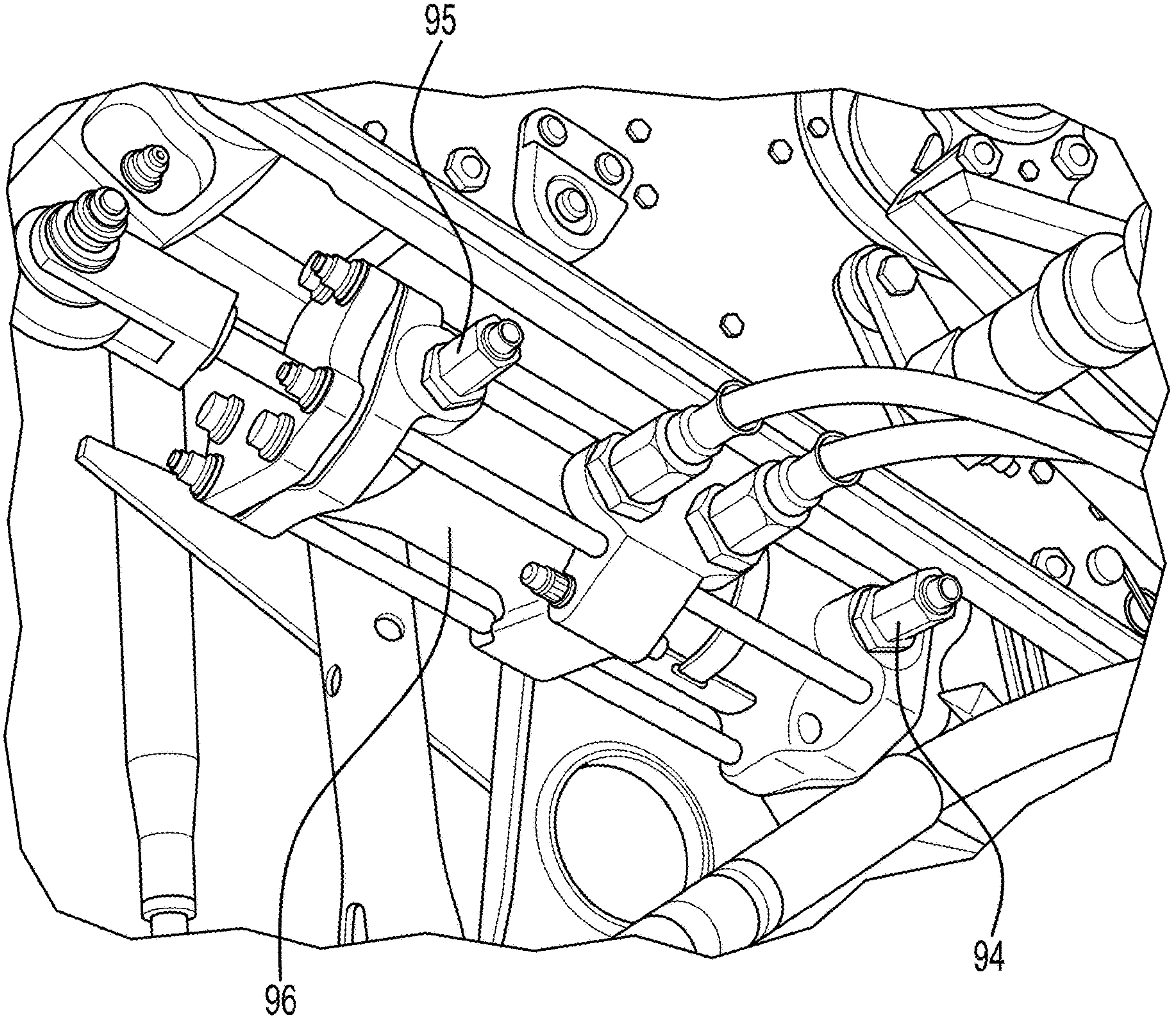
FIG. 12 is a drawing of an example of a dual feel actuator according to the present disclosure, mounted in an aircraft.

Placing the test box in the aft galley and connect the power plug
Installing test kit
Install the first pitot probe adapter 80 on the first pitot probe 60 and install the second pitot probe adapter 81 on the second pitot probe 61 (FIG. 1, FIG. 7).
Using the pitot hose assembly 82, connect first pitot adapter hose 86 to the first pitot probe adapter 80. Connect the second pitot adapter hose 87 to the second pitot probe adapter 81.
Install the pressure return hose.
Install first pressure return hose assembly 90 on the first visco drain 58 (FIG. 1).
Install second pressure return hose assembly 91 on the second visco drain 59 (FIG. 1).
Install the first pressure return hose assembly 90 onto the first air inlet connector 56 on the test box 12 (FIG. 3).
Install the second pressure return hose assembly 91 onto the second air inlet connector 57 on the test box 12 (FIG. 3).
Install the pressure transmitters
Access the Dual Feel Actuator 96 (FIG. 12) in the tail cone compartment.
Disconnect the second metered pressure hydraulic line 103 (FIG. 1) from the second metered pressure hydraulic input 95 (FIG. 12) of the dual feel actuator 96.
Install a cap on the second metered pressure hydraulic input 95 of the dual feel actuator 96.
Install second hydraulic transmitter 73 on the second metered pressure hydraulic line 103.
Disconnect the first metered pressure hydraulic line 102 (FIG. 1)

TABLE 3-continued

Example Test Preparation from the second metered pressure hydraulic input 95 (FIG. 12) of the dual feel actuator 96.
Install a cap on the second metered pressure hydraulic input 95 of the dual feel actuator 96.
Install first hydraulic transmitter 72 on the first metered pressure hydraulic line 102.
Connect first hydraulic signal cable 92 to the first hydraulic transmitter 72 and connect second hydraulic signal cable 93 to the second hydraulic transmitter 73.
Connect the first hydraulic signal cable 92 to the first electrical connector 70 on the test box 12.
Connect the second hydraulic signal cable 93 to the second electrical connector 71 on the test box 12.

TABLE 4

Example Test Procedure pressurizing the aircraft hydraulic systems using an electric motor driven pump or an engine-driven pump of the aircraft.
loosening the pressure regulator knob 40 (FIG. 3) by turning the pressure regulator knob 40 counterclockwise until the pressure regulator knob 40 spins freely.
pushing the shut off valve knob 48 toward the interface panel 20 to open the shut off valve 46.
energizing the test box 12 with the power on-off switch 26.
energizing the air pump 34 with the pump power switch 42.
observing the first pitot pressure gage 64 and the second pitot pressure gage 65 simultaneously.
slowly tightening the pressure regulator knob 40 (by turning the pressure regulator knob 40 clockwise) until the first pitot pressure gage 64 and the second pitot pressure gage 65 each read a first target pitot pressure. For example, the first target pitot pressure may be about 2.5 psig.
determining if one of the first pitot pressure gage 64 or the second pitot pressure gage 65 rises more slowly than the other, wherein a slow rising pressure in the first pitot pressure gage 64 or the second pitot pressure gage 65 is indicative of a restriction in the system corresponding to the slow rising pressure gage.
comparing the first hydraulic pressure 78 indicated on the first hydraulic pressure display 76 and the second hydraulic pressure 79 indicated on the second hydraulic pressure display 77.
determining if one of the first hydraulic pressure 78 or the second hydraulic pressure 79 is lower than the other by more than 20 percent. A lower hydraulic pressure is indicative of a restriction in the system corresponding to the lower hydraulic pressure.
pulling the shut off valve knob 48 fully in the direction away from the interface panel 20 to close the shut off valve 46.
observing the first pitot pressure gage 64 and the second pitot pressure gage 65 simultaneously.
determining if one of the first pitot pressure gage 64 or the second pitot pressure gage 65 decreases by more than a maximum allowable pressure decay amount over a two minute time interval that begins with the pulling of the shut off valve knob 48, wherein a loss of more than the maximum allowable pressure decay amount over the two minute time interval is indicative of a leak.
loosening the pressure regulator knob 40 by turning the pressure regulator knob 40 counterclockwise until the first pitot pressure gage 64 and the second pitot pressure gage 65 read within a second target pitot pressure range, and waiting for the pressure to stabilize before continuing to the next step. In examples, the second target pitot pressure range may be about 0.09 psig and about 0.16 psig.

TABLE 5

Example Post Test Procedure to Return Aircraft to Usual Condition

Release the pressure in the pitot system
Push in the shut off valve knob 48.
Loosen the pressure regulator knob 40 (by turning the pressure regulator knob 40 counterclockwise) until it can spin freely.
Once the first pitot pressure gage 64 or the second pitot pressure gage 65 read 0 psig, turn off the pump power switch 42.

TABLE 5-continued

| Example Post Test Procedure to Return Aircraft to Usual Condition |
|---|
| Remove the pressure transducers |
| Remove hydraulic power from the aircraft. |
| Remove first hydraulic transmitter 72 and second hydraulic transmitter 73. |
| Remove the caps from the first metered pressure hydraulic input 94 of the dual feel actuator 96, and from the second metered pressure hydraulic input 95 of the dual feel actuator 96. |
| Reinstall the first metered pressure hydraulic line 102 on the first metered pressure hydraulic input 94 of the dual feel actuator 96. |
| Reinstall the second metered pressure hydraulic line 103 on the second metered pressure hydraulic input 95 of the dual feel actuator 96. |
| Bleed the Elevator Control System |
| Remove the Pitot Static Equipment |
| Remove the first pitot probe adapter 80 and remove the second pitot probe adapter 81. |
| Disconnect the pitot hose assembly 82 from the first pitot probe adapter 80 and the second pitot probe adapter 81. |
| Remove the first pressure return hose assembly 90 from the first visco drain 58. |
| Remove the second pressure return hose assembly 91 from the second visco drain 59. |
| Remove safety tags and close these circuit breakers: |
| CAPT Electrical System Panel, P18-3 |

| Row | Col | Number | Name |
|---|---|---|---|
| C | 4 | C00236 | HEATERS ELEV PITOT LEFT |
| D | 4 | C00237 | HEATERS ELEV PITOT RIGHT |

Close these access panels:

| Number | Name/Location |
|---|---|
| 318BR | Tail cone Access Door |
| 311BL | Stabilizer Trim Access Door |

It is to be understood that any combination of features from an apparatus 10 disclosed herein and/or from the methods disclosed herein may be used together, and/or that any features from any or all of these aspects may be combined with any of the features of the examples disclosed herein to achieve the benefits as described in this disclosure.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. No language in the specification should be construed as indicating any unclaimed element as essential to the practice of the examples.

As used herein, ordinal numbers may be used to differentiate similar parts without conveying any particular order. For example, a "first" widget and a "second" widget may be on opposite sides of a device, and may or may not be interchangeable. Further, in this example, "first" does not necessarily convey any priority over "second."

As used herein, the term "fluid" means a gas, liquid, or combinations thereof.

In describing and claiming the examples disclosed herein, the singular forms "a", "an", and "the" include plural referents unless the context clearly dictates otherwise.

The terms "connect/connected/connection", "attach/attached/attachment" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" or "attached to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An apparatus for testing an aircraft Elevator Feel Computer (EFC), comprising:
- a test box including a housing having a base and a first cover attached to the base;
- an interface panel mounted on the base to define a base enclosure;
- an electrical power supply interface including a power on-off switch and an electrical connector for connecting the apparatus to an electrical power cable;
- a pressurized air delivery subsystem including:
  - an air pump disposed entirely within the base enclosure;
  - a regulated air port in selectable fluid communication with the air pump, the regulated air port disposed through the interface panel;
  - a pressure regulator to adjustably regulate an air pressure delivered through the regulated air port, the pressure regulator including a pressure regulator knob, located on the interface panel, for adjusting the air pressure delivered through the regulated air port;
  - a pump power switch disposed on the interface panel to selectably close an electrical power circuit that delivers electrical power to the air pump and to indicate whether or not the electrical power circuit is energized;
  - a shut off valve having a shut off valve knob disposed on the interface panel wherein the shut off valve is to selectably block the pressurized air from being delivered from the air pump to the regulated air port; and
  - a pressure relief valve disposed on the interface panel, the pressure relief valve to selectably exhaust pressurized air in a pneumatic circuit within the base enclosure, the pneumatic circuit connected to the regulated air port;
- a two-channel pneumatic pressure measurement subsystem including:
  - a first air inlet connector disposed on the interface panel, the first air inlet connector to connect to a first visco drain in fluid communication with the first pitot probe;
  - a first pneumatic circuit to fluidically connect the first air inlet connector to a first pitot pressure gage to indicate a first pneumatic pressure in the first pneumatic circuit;

a second air inlet connector disposed on the interface panel, the second air inlet connector to connect to a second visco drain in fluid communication with a second pitot probe; and a second pneumatic circuit to fluidically connect the second air inlet connector to a second pitot pressure gage to indicate a second pneumatic pressure in the second pneumatic circuit;

a two-channel hydraulic pressure measurement subsystem including:

a first electrical connector disposed on the interface panel, the first electrical connector to connect to a first hydraulic transmitter;

a first electrical circuit defined within the base enclosure to electrically connect the first electrical connector to a first hydraulic pressure display to indicate a first hydraulic pressure;

a second electrical connector disposed on the interface panel, the second electrical connector to connect to a second hydraulic transmitter; and a second electrical circuit to electrically connect the second electrical connector to a second hydraulic pressure display to indicate a second hydraulic pressure.

2. The apparatus of claim 1 wherein the pressurized air delivery subsystem further comprises:

a first pitot probe adapter to connect to a first pitot probe wherein the first pitot probe adapter is to reversibly form a pressure tight connection with the first pitot probe;

a second pitot probe adapter to connect to a second pitot probe wherein the second pitot probe adapter is to reversibly form a pressure tight connection with the second pitot probe; and a pitot hose assembly including an air input hose, a T-fitting connected to the air input hose, a first pitot adapter hose to connect the T-fitting and the first pitot probe adapter, and a second pitot adapter hose to connect the T-fitting and the second pitot probe adapter, wherein the pressurized air delivery system is to deliver pressurized air simultaneously to the first pitot probe and the second pitot probe.

3. The apparatus of claim 1 wherein the first pitot pressure gage and the second pitot pressure gage each include a liquid crystal display (LCD) and wherein the first pitot pressure gage and the second pitot pressure gage each have an operating span of 0 psig to 10 psig with an accuracy within 0.1 percent of the operating span.

4. The apparatus of claim 1 wherein the pneumatic pressure measurement subsystem further comprises:

a first pressure return hose assembly to fluidically connect the first air inlet connector to the first visco drain; and a second pressure return hose assembly to fluidically connect the second air inlet connector to the second visco drain.

5. The apparatus of claim 1, further comprising:

a first hydraulic signal cable to connect the first electrical connector to the first hydraulic transmitter; and a second hydraulic signal cable to connect the second electrical connector to the second hydraulic transmitter.

6. The apparatus of claim 1 wherein:

the first hydraulic transmitter is to fluidically connect to a first metered pressure hydraulic input of a dual feel actuator from the EFC to measure the first hydraulic pressure and transmit a signal indicative of the first hydraulic pressure; and the second hydraulic transmitter is to fluidically connect to a second metered pressure hydraulic input of the dual feel actuator from the EFC to measure a second hydraulic pressure and transmit a signal indicative of the second hydraulic pressure.

7. The apparatus of claim 6 wherein:

the first hydraulic transmitter is to be connected to a first hydraulic T-connector in fluid communication with the first metered pressure hydraulic input of the dual feel actuator from a first metered pressure hydraulic output of the EFC;

a first metered pressure hydraulic line is to remain connected between the first metered pressure hydraulic output of the EFC and the first metered pressure hydraulic input of the dual feel actuator during operation of the apparatus;

the second hydraulic transmitter is to be connected to a second hydraulic T-connector in fluid communication with the second metered pressure hydraulic input of the dual feel actuator from a second metered pressure hydraulic output of the EFC; and a second metered pressure hydraulic line is to remain connected between the second metered pressure hydraulic output of the EFC and the second metered pressure hydraulic input of the dual feel actuator during the operation of the apparatus.

8. The apparatus of claim 6 wherein:

the first hydraulic transmitter is to be connected to a first metered pressure hydraulic line in fluid communication with the first metered pressure hydraulic output of the EFC;

the first metered pressure hydraulic line is to remain connected to the first metered pressure hydraulic output of the EFC during operation of the apparatus;

the first metered pressure hydraulic line is to be disconnected from the first metered pressure hydraulic input of the dual feel actuator during operation of the apparatus;

the first metered pressure hydraulic input of the dual feel actuator is to be capped during operation of the apparatus;

the second hydraulic transmitter is to be connected to a second metered pressure hydraulic line in fluid communication with the second metered pressure hydraulic output of the EFC;

the second metered pressure hydraulic line is to remain connected to the second metered pressure hydraulic output of the EFC during operation of the apparatus;

the second metered pressure hydraulic line is to be disconnected from the second metered pressure hydraulic input of the dual feel actuator during operation of the apparatus; and the second metered pressure hydraulic input of the dual feel actuator is to be capped during operation of the apparatus.

9. The apparatus of claim 1, further comprising:

at least one tethered dust cap assembly having a dust cap and a tether connected to the dust cap wherein the tether is to be fastened to the interface panel to retain the dust cap when the dust cap is removed from a coverable connector, wherein the coverable connector includes at least one of: the regulated air port, the first air inlet connector, the second air inlet connector, the first electrical connector, or the second electrical connector.

10. The apparatus of claim 1 wherein at least one of the first hydraulic transmitter or the second hydraulic transmitter comprises:

a hydraulic pressure transducer having an operating pressure range from about 0 psi to about 3000 psi;
a hydraulic connector having ¼ inch male National Pipe Thread (NPT) threads;
an electrical connector having 4 pins; and
a signal output range from about 4 mA to about 20 mA.

11. The apparatus of claim 1, the test box further comprising:
a first hinge to attach the first cover to the base;
a latch to selectably secure the first cover to the base in a sealed configuration; and
a test box handle attached to the test box to facilitate lifting and carrying the test box, wherein the housing fits in a space that is about 14 inches long, about 12 inches wide, and about 6 inches tall to facilitate setup and operation of the test box in an aft galley of an airliner.

12. An aircraft Elevator Feel Computer (EFC) test kit, comprising:
a rigid case having:
a bin;
a second cover attached to the bin by a second hinge;
a second latch to selectably secure the second cover to the bin in a closed configuration;
a test kit case handle attached to the rigid case; and
a pair of wheels attached to the rigid case, wherein the rigid case fits in a space that is about 32 inches long, about 21 inches wide, and about 12 inches tall to facilitate setup of the EFC test kit in an aft galley of an airliner;
a test box including:
a housing having a base;
a first cover attached to the base;
a first hinge to attach the first cover to the base;
a latch to selectably secure the first cover to the base in a sealed configuration;
a test box handle attached to the test box to facilitate lifting and carrying the test box, wherein the housing fits in a space that is about 14 inches long, about 12 inches wide, and about 6 inches tall to facilitate setup and operation of the test box in an aft galley of an airliner;
an interface panel mounted on the base to define a base enclosure;
an electrical power supply interface including a power on-off switch and an electrical connector for connecting the apparatus to an electrical power cable;
a two-channel pneumatic pressure measurement subsystem including:
a first air inlet connector disposed on an interface panel, the first air inlet connector to connect to a first visco drain in fluid communication with a first pitot probe;
a second air inlet connector disposed on the interface panel, the second air inlet connector to connect to a second visco drain in fluid communication with a second pitot probe;
a two-channel hydraulic pressure measurement subsystem including:
a first electrical connector disposed on the interface panel, the first electrical connector to connect to a first hydraulic transmitter;
a first electrical circuit defined within the base enclosure to electrically connect the first electrical connector to a first hydraulic pressure display to indicate a first hydraulic pressure;
a second electrical connector disposed on the interface panel, the second electrical connector to connect to a second hydraulic transmitter; and
a second electrical circuit to electrically connect the second electrical connector to a second hydraulic pressure display to indicate a second hydraulic pressure;
the electrical power cable;
a pitot hose assembly including:
an air input hose;
a T-fitting connected to the air input hose;
a first pitot adapter hose to connect the T-fitting and a first pitot probe adapter, wherein the first pitot probe adapter is to connect to the first pitot probe wherein the first pitot probe adapter is to reversibly form a pressure tight connection with the first pitot probe; and
a second pitot adapter hose to connect the T-fitting and a second pitot probe adapter, wherein the second pitot probe adapter is to connect to the second pitot probe, wherein the second pitot probe adapter is to reversibly form a pressure tight connection with the second pitot probe wherein a pressurized air delivery system is to deliver pressurized air simultaneously to the first pitot probe and the second pitot probe via the pitot hose assembly;
a first pressure return hose assembly to fluidically connect the first air inlet connector to the first visco drain and a second pressure return hose assembly to fluidically connect the second air inlet connector to the second visco drain;
a first hydraulic signal cable to connect the first electrical connector to the first hydraulic transmitter, and a second hydraulic signal cable to connect the second electrical connector to the second hydraulic transmitter;
a hose grip assembly having a suction cup and hose retainer to support hoses in an organized arrangement during setup and operation of the test box;
the first pitot probe adapter and the second pitot probe adapter;
a first pretest pin and a second pretest pin for installing in the first pitot probe adapter or the second pitot probe adapter to isolate a suspected leak during operation of the test box;
the first hydraulic transmitter and the second hydraulic transmitter; and
a bottle of lubrication fluid for lubricating the first pitot probe adapter and the second pitot probe adapter, wherein the elements of the test kit, other than the rigid case, fit entirely within the rigid case when the first cover is latched to the bin in the closed configuration.

13. A method of using the apparatus for testing the aircraft Elevator Feel Computer (EFC) of claim 1, comprising:
pressurizing the aircraft hydraulic systems using an electric motor driven pump or an engine-driven pump of the aircraft;
loosening the pressure regulator knob by turning the pressure regulator knob counterclockwise until the pressure regulator knob spins freely;
pushing the shut off valve knob toward the interface panel to open the shut off valve;
energizing the test box with the power on-off switch;
energizing the air pump with the pump power switch;
observing the first pitot pressure gage and the second pitot pressure gauge simultaneously;

slowly tightening the pressure regulator knob until the first pitot pressure gage and the second pitot pressure gauge each read a first target pitot pressure;

determining if one of the first pitot pressure gage or the second pitot pressure gage rises more slowly than the other, wherein a slow rising pressure in the first pitot pressure gage or the second pitot pressure gage is indicative of a restriction in the system corresponding to the slow rising pressure gage;

comparing the first hydraulic pressure indicated on the first hydraulic pressure display and the second hydraulic pressure indicated on the second hydraulic pressure display;

determining if one of the first hydraulic pressure or the second hydraulic pressure is lower than the other by more than 20 percent, wherein a lower hydraulic pressure is indicative of a restriction in the system corresponding to the lower hydraulic pressure;

pulling the shut off valve knob fully in the direction away from the interface panel to close the shut off valve;

observing the first pitot pressure gage and the second pitot pressure gauge simultaneously;

determining if one of the first pitot pressure gage or the second pitot pressure gage decreases by more than a maximum allowable pressure decay amount over a two minute time interval that begins with the pulling of the shut off valve knob, wherein a loss of more than the maximum allowable pressure decay amount over the two minute time interval is indicative of a leak; and loosening the pressure regulator knob by turning the pressure regulator knob counterclockwise until the first pitot pressure gage and the second pitot pressure gage read within a lower pressure target range, and waiting for the pressure to stabilize before continuing to the next step.

14. The method of claim 13 wherein the first target pitot pressure is about 2.5 psig.

15. The method of claim 13 wherein the pitot pressure lower target range is about 0.09 psig and about 0.16 psig.

16. The method of claim 13 wherein the maximum allowable pressure decay amount is about 0.2 psig over a 2 minute time interval.

* * * * *